Oct. 9, 1934.  J. PLATZER  1,976,090
VARIABLE SPEED GEAR
Filed Sept. 12, 1933
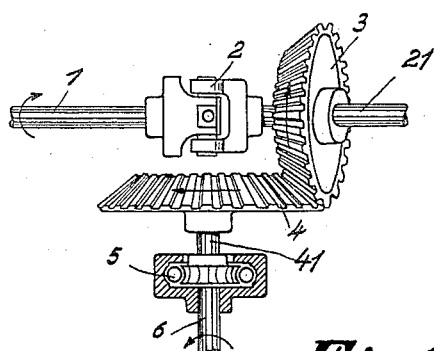
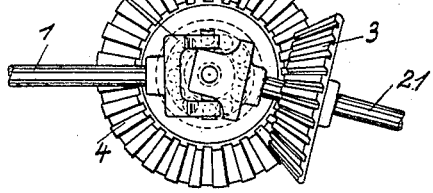
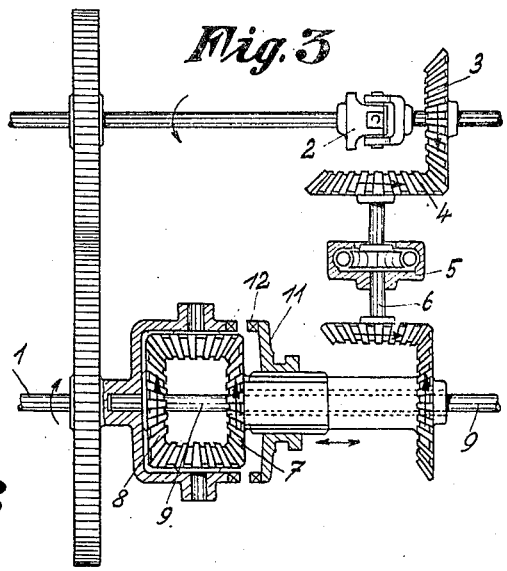
JOSEF PLATZER
INVENTOR
BY Haseltine, Lake & Co.
ATTORNEYS Patented Oct. 9, 1934

1,976,090

UNITED STATES PATENT OFFICE 1,976,090

VARIABLE SPEED GEAR

Josef Platzer, Landeck, Austria

Application September 12, 1933, Serial No. 689,079
In Austria September 28, 1932

2 Claims. (Cl. 74—283)

This invention relates to variable speed gears of that class in which a driving shaft actuates an element capable of rocking which imparts to the driven shaft by means of a pawl and ratchet or an equivalent gearing a rotary movement with a speed periodically varying in each revolution. Such variable speed gears have already been proposed, but in these known variable speed gears transmitting elements have been used which undergo not only a variation of speed, but also a change of direction of movement or rotation whereby the construction of these gearings is greatly complicated and these gears cannot be used for many purposes because the inertia of the parts changing their direction of rotation cannot be properly controlled at high speeds.

The variable speed gears heretofore proposed for obtaining a non stop by stop control of the speed of the driven shaft and for this purpose are based on the principle of producing periodically varying speeds of intermediate rotary elements by Cardan joints and by means of pawl and ratchet gears utilizing the variation of the speed thus produced, are all open to the objection that they involve parts having mutual surfaces making contact with each other in order to transmit the power and being moved relatively to each other in the course of the control of the speed. This necessitates a considerable expenditure of power since in order to vary the ratio of transmission, the frictional resistance must be overcome, which furthermore entails an appreciable wear of the parts. This frictional resistance also introduces various obstacles to securing smooth and accurate running of all the parts, since either one shaft must be axially movable in its bearings, precluding the use of ball bearings, or else the same shaft must be made of two parts connected by a clutch which allows considerable relative axial movement. It should even be added that the mentioned frictional resistance also increases the strains which are brought to bear on the Cardan joints.

The object of my invention is to obviate these drawbacks of the variable speed gears in question. With this object in view the present invention consists in the first place in substituting for the element capable of rocking a Cardan joint interposed between the driving shaft and an intermediate shaft, the latter being operatively connected to the driving part of a pawl and ratchet gearing or equivalent gearing and the driving part of the said part and ratchet or equivalent gearing being operatively connected to the driven shaft of the variable speed gear.

In the variable speed gear according to the present invention it is only the speed of the various parts that varies, but not the direction of rotation. Therefore the present variable speed gears are suitable for use with high speeds and may serve as speed increasing or speed reducing gears.

The accompanying drawing illustrates by way of example several embodiments of the present invention. Fig. 1 is a side elevation and Fig. 2 is a plan view of the simplest embodiment of the invention. Fig. 3 is a side elevation of another embodiment of the invention.

Referring now to Figs. 1 and 2, 1 is the driving shaft of the variable speed gear and 21 is an intermediate shaft connected with the driving shaft by a Carden joint, 3 is a bevel wheel fast on the intermediate shaft 21 and meshing with a corresponding bevel wheel 4 fast on a shaft 41 actuating the driving part of a pawl and ratchet or equivalent gearing, as shown in Figs. 1 and 2 a free wheel gearing, the driven part of which actuates the driven shaft 6 of the variable speed gear. The intermediate shaft 21 and the bevel wheel 3 are driven by the Carden joint with an angular speed varying periodically in the course of each revolution according to the angle between the driving shaft 1 and the said intermediate shaft 21 and therefore also the bevel wheel 4 and its shaft 41 as also the gearing 5 and the driven shaft 6 of the variable speed gear are driven with speeds periodically varying according to the angle between the driving shaft 1 and the intermediate shaft 21.

Without departing from the essence of the invention for the bevel wheel gearing 3, 4 any other substantially equivalent gearing or even a belt and pulley gearing or a flexible shafting may be substituted and may be arranged ahead or in rear of the pawl and ratchet or equivalent gearing 5. If the driven shaft 6 of the variable speed gear carries sufficiently large revolving masses, the speed of this driven shaft will be approximately uniform and will correspond to the maximum angular speed of the shaft 41 actuating the driving part of the pawl and ratchet or equivalent gearing 5. In the absence of such revolving masses two or more individual speed gears as above described may be arranged to cooperate in such a manner that the Cardan joints set at angles will impart to the driven shaft in uniform succession always high speeds. The gear according to Fig. 1 allows only to obtain an increase of the number of revolutions per unit of time of the driven shaft, with respect to the driving shaft, supposed that the bevel wheels 3 and 4 have the same diameter.

The modification illustrated in Fig. 3 serves for increasing the range of adjustment. In this figure the upper part shows the gear illustrated in Fig. 1 with the driving shaft 1 and the driven shaft 6. With this gear a differential gear of known construction is associated in such a special manner that the shaft 1 drives the planet wheel carrier of the differential and the shaft 6 drives the part 7 of the differential gear while the central or sun wheel 8 of the differential gear drives the main driven shaft 9 of the total variable speed gear. The planet wheel carrier, the part 7 and the part 8 of the differential gear rotate in the same direction and therefore the shaft 9 will come to a standstill when the part 7 revolves with double the number of revolutions of the planet wheel carrier. When the speed of the wheel 7 is reduced by the action of the controlling gear 2, 3, 4, 5, the wheel 8 and thereby also the driven main shaft 9 are caused to revolve. For this purpose it is necessary that the pawl and ratchet or equivalent gearing locks in such a manner that the outer ring of the last named gearing never can reach a higher speed than the inner ring of the last named gearing. The greater the angle between the shaft of the level wheel 3 and its driving shaft is, the more marked are the periodical variations of the angular speed of the inner ring of the pawl and ratchet or equivalent gearing and the more the speed of the bevel wheel 7 is reduced whereby the speed of shaft 9 is increased. When the number of revolutions per minute of the wheel 7 is so far reduced that it becomes equal to that of the planet wheel carrier then all the parts of the differential gear run with the same number of revolutions and it is possible to bring into rigid clutch engagement the planet wheel carrier and the wheel 7 by means of the clutch 11 sliding in grooves on the boss of the wheel 7 whereby the controlling gear 2, 3, 4, 5 is fully released. This simple possibility of releasing results in a great advantage for the pawl and ratchet or equivalent gearing which is subjected to great wear for it permits to fully spare the last named gearing at the normal number of revolutions.

I wish it to be understood that the term "pawl and ratchet gear" used in the following claims also includes any gearing equivalent to pawl and ratchet gearings such as a free wheel mechanism.

What I claim is:

1. A variable speed gear, comprising a drive shaft, a driven shaft, an intermediate shaft, a universal joint connected at one side to said drive shaft and at the other side to said intermediate shaft, which intermediate shaft is capable of oscillating about the center of said universal joint, a bevel gear interposed between said intermediate shaft and said driven shaft and comprising a bevel gear proper which is fast on said intermediate shaft, a second bevel gear meshing with said first mentioned bevel gear and actuating the driven shaft, and a pawl and ratchet gear operatively connecting one of said bevel gears with the shaft associated therewith.

2. A variable speed gear, comprising a drive shaft, a driven shaft, an intermediate shaft, a universal joint connected at one side to said drive shaft and at the other side to said intermediate shaft, which intermediate shaft is capable of oscillating about the center of said universal joint, a bevel gear interposed between said intermediate shaft and said driven shaft and comprising a bevel gear proper which is fast on said intermediate shaft, a second bevel gear meshing with said first mentioned bevel gear and actuating the driven shaft, and a pawl and ratchet gear operatively connecting the second bevel gear with a driven shaft and comprising both a first member fast on said second bevel gear and a second member connected with the second driven shaft by means of a differential gear including a first central bevel gear, a planet gear carrier, a second central bevel gear, means for connecting said planet gear carrier with said second central bevel gear, means for operatively connecting said first central bevel gear with said second member of said pawl and ratchet gear, means for operatively connecting said planet gear carrier with said drive shaft, and means for operatively connecting said second central bevel gear with said driven shaft.

JOSEF PLATZER.